US012389161B2

(12) United States Patent
Ren et al.

(10) Patent No.: US 12,389,161 B2
(45) Date of Patent: *Aug. 12, 2025

(54) COAXIAL SPEAKER

(71) Applicant: AAC Microtech (Changzhou) Co., Ltd., Changzhou (CN)

(72) Inventors: Zhang Ren, Shenzhen (CN); Zhiwei Zhong, Shenzhen (CN); Qi Wang, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/914,352

(22) PCT Filed: Jul. 20, 2022

(86) PCT No.: PCT/CN2022/106701

§ 371 (c)(1),
(2) Date: Sep. 25, 2022

(87) PCT Pub. No.: WO2024/000686

PCT Pub. Date: Jan. 4, 2024

(65) Prior Publication Data

US 2025/0133343 A1 Apr. 24, 2025

(30) Foreign Application Priority Data

Jun. 30, 2022 (CN) ........................ 202221694461.X

(51) Int. Cl.
*H04R 7/04* (2006.01)
*H04R 9/06* (2006.01)

(52) U.S. Cl.
CPC ................. *H04R 7/04* (2013.01); *H04R 9/06* (2013.01)

(58) Field of Classification Search
CPC . H04R 9/025; H04R 9/06; H04R 1/24; H04R 9/02; H04R 9/063; H04R 9/045;
(Continued)

(56) References Cited

U.S. PATENT DOCUMENTS

2002/0168074 A1* 11/2002 Miyamoto ............... H04R 9/10
381/182
2004/0071303 A1* 4/2004 Furuya .................. H04M 1/035
379/433.02
(Continued)

FOREIGN PATENT DOCUMENTS

CN 201781608 U * 3/2011

*Primary Examiner* — Carolyn R Edwards
*Assistant Examiner* — Julie X Dang
(74) *Attorney, Agent, or Firm* — Wiersch Law Group

(57) ABSTRACT

The present invention provides a coaxial speaker including a frame, a magnetic circuit system, a first vibration system fixed on an inner side of the frame, and a second vibration system fixed on an outer side of the frame. The first vibration system locates coaxially with the second vibration system. The first vibration system includes a first diaphragm and a first voice coil. The second vibration system includes a second diaphragm and a second voice coil. The magnetic circuit system includes a first magnetic gap and a second magnetic gap. The first voice coil at least partially locates into the first magnetic gap, the second voice coil at least partially locates into the second magnetic gap. The first diaphragm is used for generating treble sound, and the second diaphragm is used for generating bass sound. Bass sound and treble sound form a full-range speaker, providing high-quality sound.

9 Claims, 5 Drawing Sheets

(58) Field of Classification Search
CPC ........ H04R 7/18; H04R 2400/11; H04R 3/00; H04R 9/043
USPC .......................................... 381/397, 421, 386
See application file for complete search history.

(56) References Cited

U.S. PATENT DOCUMENTS

| | | | | |
|---|---|---|---|---|
| 2013/0195293 | A1* | 8/2013 | Ko | H04R 19/02<br>381/191 |
| 2023/0292037 | A1* | 9/2023 | Xu | H04R 1/24 |
| 2024/0073612 | A1* | 2/2024 | Ren | H04R 7/18 |

* cited by examiner

COAXIAL SPEAKER

FIELD OF THE PRESENT INVENTION

The present invention relates to the field of electro-acoustic devices, and more particularly, to a coaxial speaker used in electronic speaker box products.

DESCRIPTION OF RELATED ART

Coaxial speaker refers to the speaker with the integration of the treble unit and bass unit, and the treble unit and bass unit are set coaxially. The sound source of the treble unit and bass unit of the coaxial speaker can be located in front of the coaxial speaker, that is, the two speaker units sounding along a same direction. The sound source of the treble unit and bass unit of the coaxial speaker can also be located in front and back of the coaxial speaker respectively, that is, the two speaker units sounding along different directions.

In related art, the treble unit and bass unit of the coaxial speaker usually each includes an independent vibration system and an independent magnetic circuit system, and the structure of the coaxial speaker is complex. The overall height of the coaxial speaker composed of the treble unit and the bass unit coaxially is increased, which leads to inconvenient installation due to the high height and reduces the applicability of the product. In addition, the separated treble magnetic circuit and bass magnetic circuit also increase the production cost, and reduce the market competitiveness of the product. In the related art, the effective area of the diaphragm in the speaker is limited, which cannot meet the requirements of the full sound range.

Therefore, it is desired to provide a new coaxial speaker which can overcome the above problems.

SUMMARY

In view of the above, the embodiments of the present invention provide a new coaxial speaker. By the present invention, the coaxial speaker has a compact structure and with high sound quality of the treble sound and bass sound.

The present invention provides a coaxial speaker including a frame, a magnetic circuit system mounted under the frame, a first vibration system fixed on an inner side of the frame, and a second vibration system fixed on an outer side of the frame and surrounding the first vibration system. The first vibration system locates coaxially with the second vibration system. The first vibration system includes a first diaphragm and a first voice coil driving the first diaphragm to generate sounds. The second vibration system includes a second diaphragm and a second voice coil driving the second diaphragm to generate sounds. The magnetic circuit system includes a first magnetic gap and a second magnetic gap located outside of the first magnetic gap. The first voice coil at least partially locates into the first magnetic gap, and the second voice coil at least partially locates into the second magnetic gap. The first diaphragm is used for generating treble sound, and the second diaphragm is used for generating bass sound.

As an improvement, the coaxial speaker further includes an inserting member surrounded by the magnetic circuit system, a first circuit board fixed with the inserting member, and a first terminal provided passing through the inserting member, the first voice coil electrically connected to the first circuit board through the first terminal.

As an improvement, the coaxial speaker further includes a support shelf and an elastic assembly connecting the second vibration system and the support shelf, the elastic assembly including a second circuit board and a support membrane connected with the second circuit board, the second voice coil electrically connected to the second circuit board.

As an improvement, the magnetic circuit system includes a magnetic bowl, the magnetic bowl including a side wall enclosing a receiving room and a bottom wall bending and extending from an end of the side wall, the inserting member accommodated in the receiving room, the magnetic circuit system further including a first magnet assembly disposed on one side of the magnetic bowl and a second magnet assembly disposed on the other side of the magnetic bowl, the first magnet assembly including a first magnet, the first magnetic gap formed between the first magnet and the side wall of the magnetic bowl, the second magnet assembly including a second magnet and a third magnet located outside of the second magnet and forming the second magnetic gap with the second magnet.

As an improvement, the first magnet, the second magnet and the third magnet are magnetized along a vibration direction of the coaxial speaker, and the first magnet and second magnet are set opposite each other with a same pole, and the second magnet and third magnet are magnetized in opposite directions.

As an improvement, the first diaphragm includes a first dome, a first suspension surrounding the first dome, and a first fixing portion extending from an outer edge of the first suspension, the frame having an inner side wall, the first fixing portion attached and fixed to the inner side wall.

As an improvement, the first magnet assembly includes a pole plate disposed on the first magnet, and the first fixing portion is partially sandwiched between the frame and the pole plate.

As an improvement, the frame includes an outer side wall, the second diaphragm including a second suspension, a second dome surrounding the second suspension, and a third suspension surrounding the second dome, the third suspension mounted to the support shelf, the second vibration system further including a voice coil support connecting the second suspension, the second dome, and the third suspension to the second voice coil, an end of the second suspension proximal to the first vibration system fixed to the outer side wall of the frame, and/or the first magnet.

As an improvement, the voice coil support includes a flat portion attached to the second dome, a first extending portion bending and extending from the flat portion to the second circuit board and connected to the second circuit board, and a second extending portion bending and extending from the flat portion to the second voice coil and connected to the second voice coil.

As an improvement, a leakage channel is provided passing through the inserting member.

BRIEF DESCRIPTION OF THE DRAWINGS

Many aspects of the exemplary embodiments can be better understood with reference to the following drawing. The components in the drawing are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present invention more apparent, the present invention is described in further detail together with the figures and the embodiments. It should be understood the specific embodiments described hereby is only to explain the disclosure, not intended to limit the disclosure.

Figure 1:
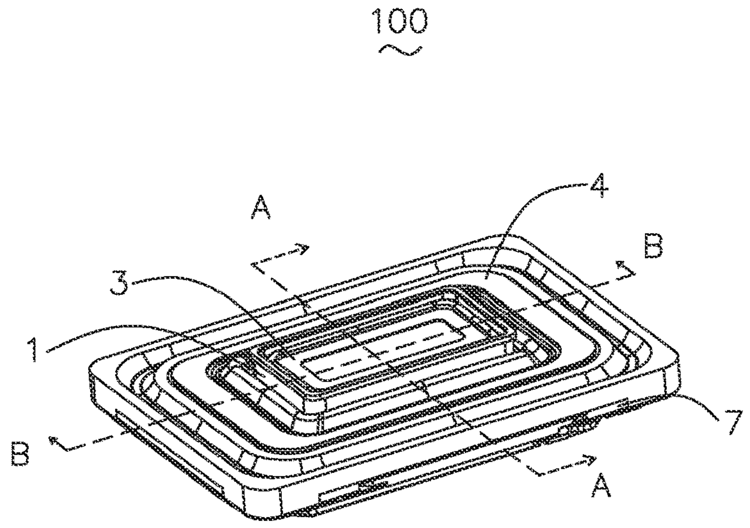
FIG. 1 is an illustrative isometric view of a coaxial speaker in accordance with one embodiment of the present invention.
Figure 2:
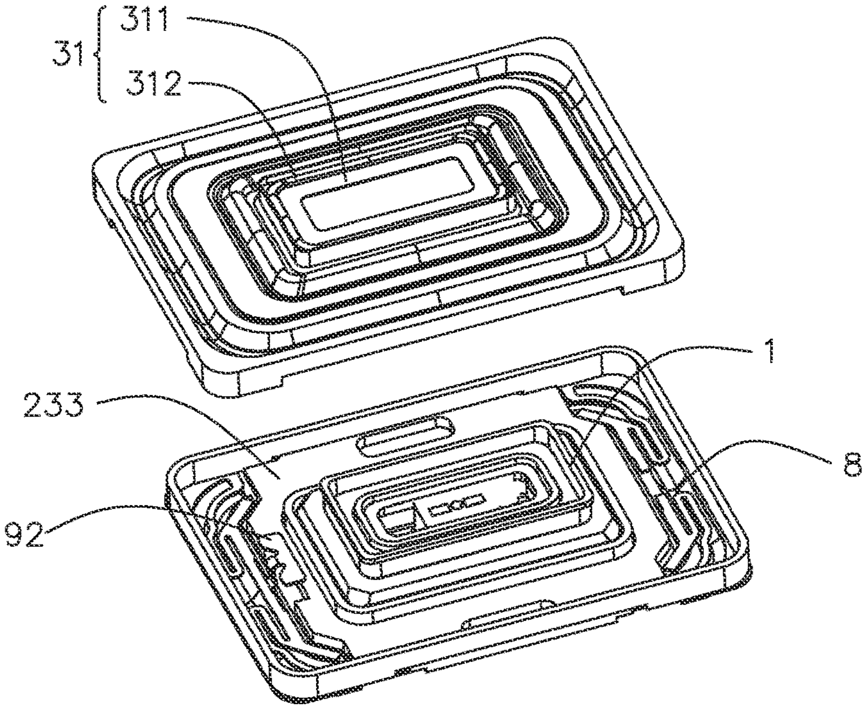
FIG. 2 is a partially exploded view of the coaxial speaker of FIG. 1.
Figure 3:
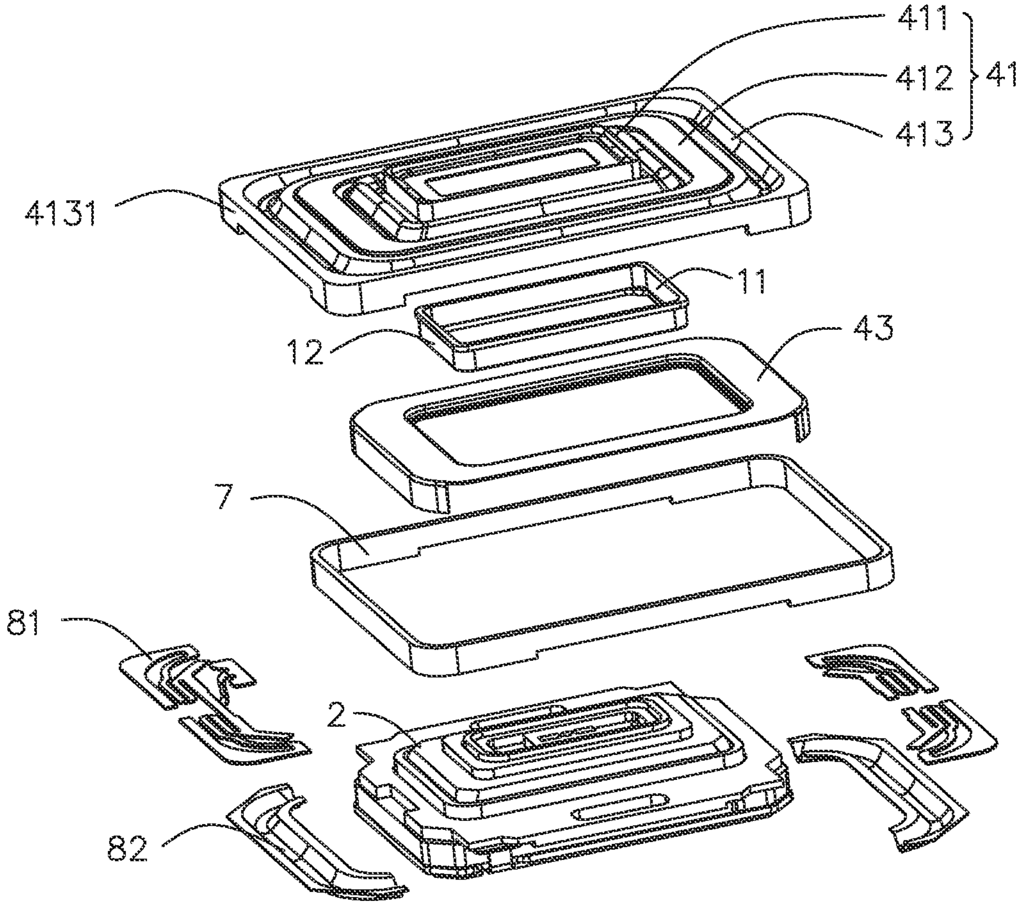
FIG. 3 is another partially exploded view of the coaxial speaker of FIG. 1.
Figure 4:
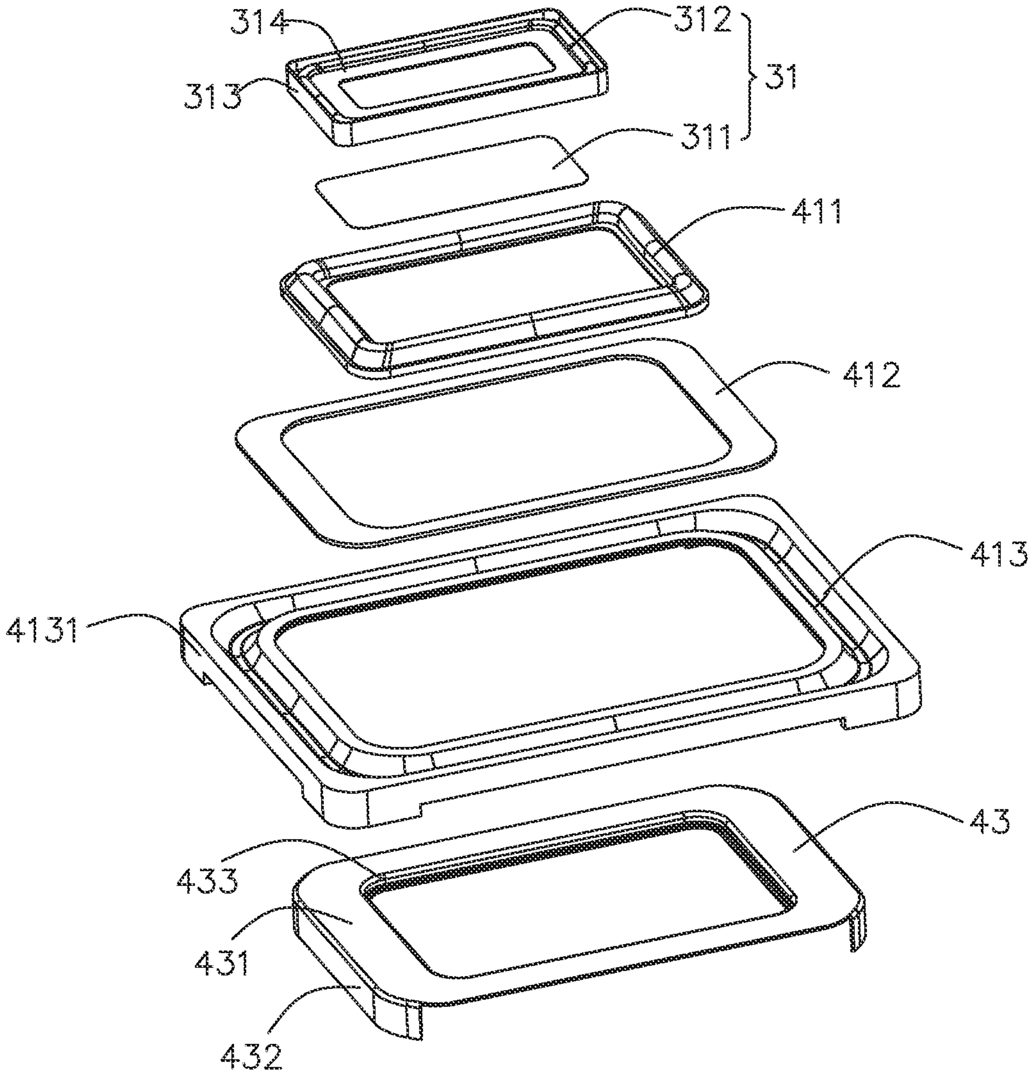
FIG. 4 is an exploded view of partly members of the coaxial speaker of FIG. 1.
Figure 5:
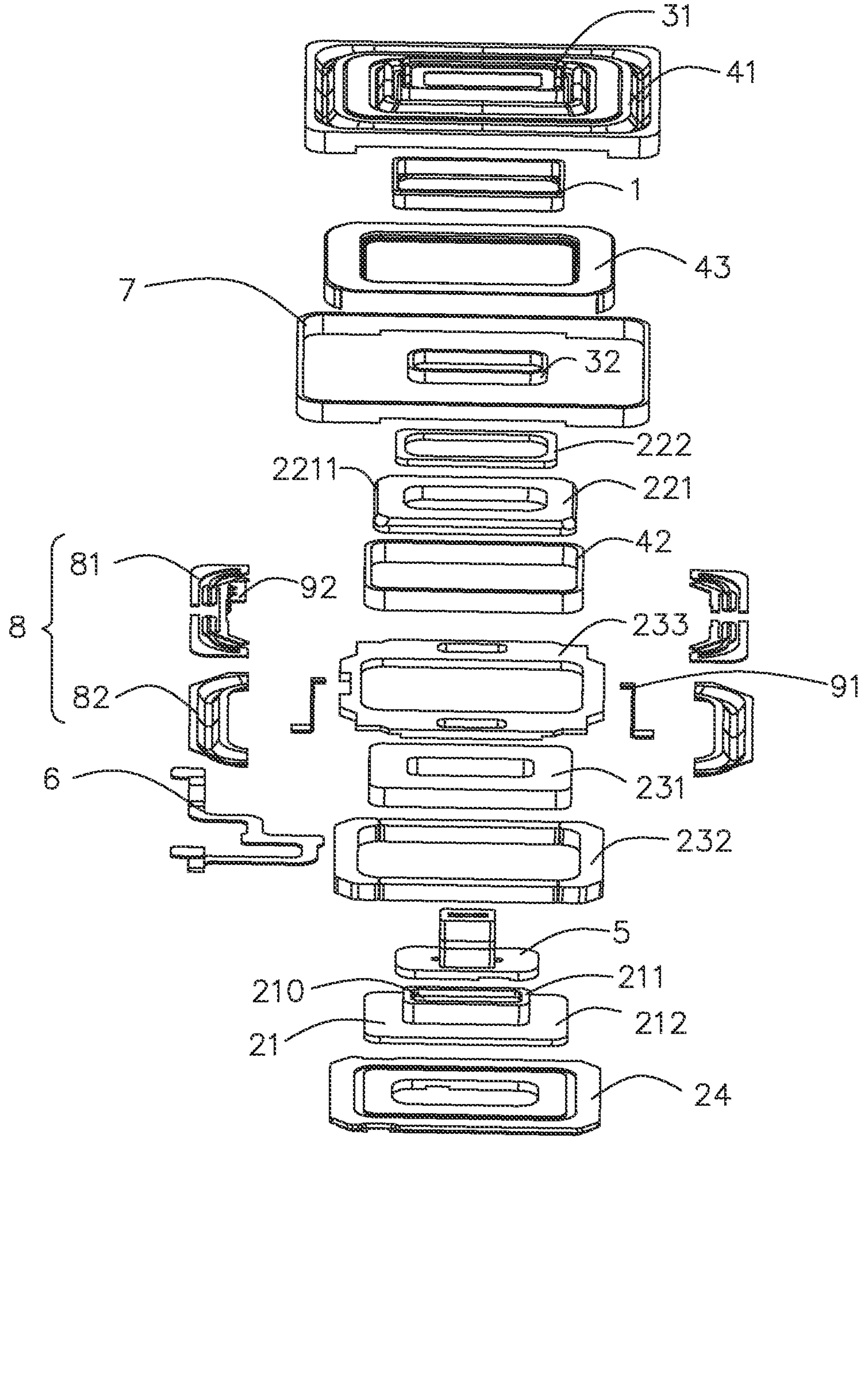
FIG. 5 is an exploded view of the coaxial speaker of FIG. 1.
Figure 6:
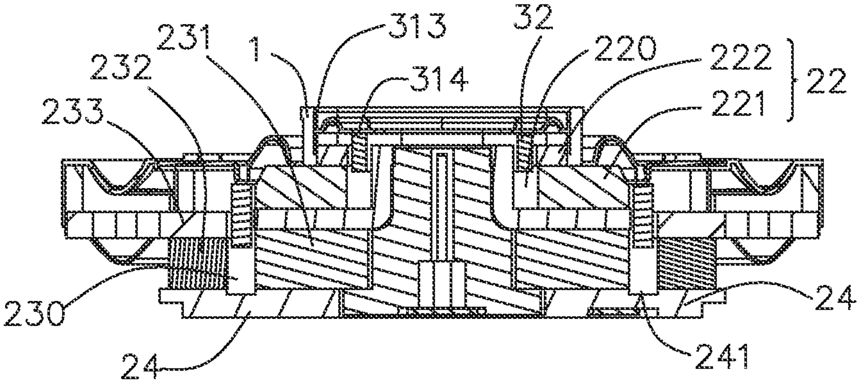
FIG. 6 is an illustrative cross-sectional view of the coaxial speaker taken along line A-A of FIG. 1.
Figure 7:
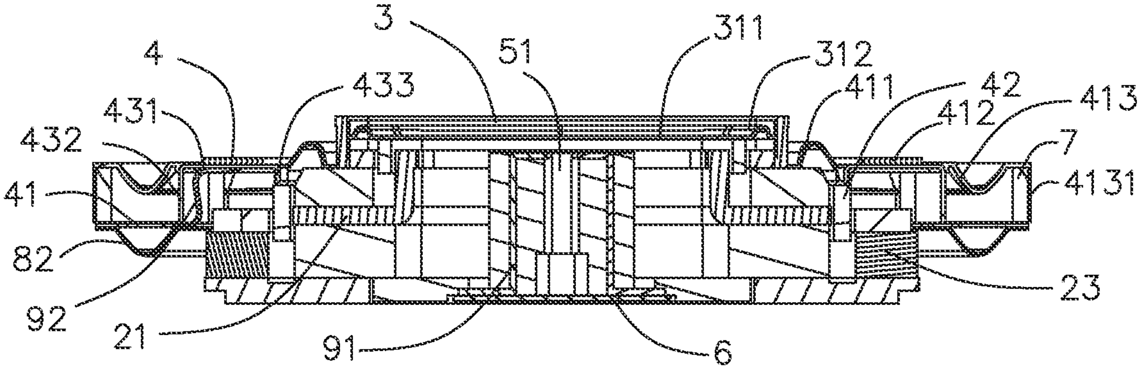
FIG. 7 is an illustrative cross-sectional view of the coaxial speaker taken along line B-B of FIG. 1.

Referring to the FIGS. 1-7, the present invention provides one embodiment of a coaxial speaker 100. The coaxial speaker 100 includes a frame 1, a magnetic circuit system 2 mounted under the frame 1, a first vibration system 3 fixed on an inner side of the frame 1, a second vibration system 4 fixed on an outer side of the frame 1, an inserting member 5, a first circuit board 6 fixed with the inserting member 5, a support shelf 7, an elastic assembly 8. The second vibration system 4 locates around the first vibration system 3 and is arranged coaxially with the first vibration system 3.

The frame 1 is substantially rectangular, and includes an inner side wall 11 and an outer side wall 12 opposite to the inner side wall 11. The first vibration system 3 is fixed to the inner side wall 11 of the frame 1, and the second vibration system 4 is fixed to the outer side wall 12 of the frame 1.

The magnetic circuit system 2 includes a magnetic bowl 21, a first magnet assembly 22 disposed on one side of the magnetic bowl 21, and a second magnet assembly 23 disposed on the other side of the magnetic bowl 21. The magnetic bowl 21 includes a side wall 211 enclosing a receiving room 210 and a bottom wall 212 bending and extending from an end of the side wall 211. The first magnet assembly 22 includes a first magnet 221 and a pole plate 222 disposed on the first magnet 221. A space between the first magnet 221 and the side wall 211 of the magnetic bowl 21 forms a first magnetic gap 220. An outer edge of a surface of the first magnet 221 closed to the second vibration system 4 is provided with a cut surface 2211. The bottom wall 212 of the magnetic bowl 21 supports the first magnet 221.

The second magnet assembly 23 includes a second magnet 231, a third magnet 232 located outside of the second magnet 231 and forming a second magnetic gap 230 with the second magnet 231, a magnetic guiding plate 233 located on the third magnet 232. The bottom wall 212 of the magnetic bowl 21 is stacked above the second magnet 231. The first magnet 221 is disposed opposite to the second magnet 231. The magnetic circuit system 2 further includes a yoke 24 supporting the second magnet 231 and the third magnet 232. A lower surface of the yoke 24 is flush with the lower surface of the inserting member 5.

The first magnet 221, the second magnet 231 and the third magnet 232 are magnetized along a vibration direction of the coaxial speaker 100, and the first magnet 221 and second magnet 231 are set opposite each other with a same pole, that is, the first magnet 221 and the second magnet 231 are magnetized in opposite directions. The second magnet 231 and third magnet 232 are magnetized in opposite directions. In present embodiment, the first magnet 221, the pole plate 222, the second magnet 231, the third magnet 232, and the magnetic guiding plate 233 can all be hollow annular structures.

The first vibration system 3 includes a first diaphragm 31 and a first voice coil 32 driving the first diaphragm 31 to generate sounds. The first voice coil 32 is at least partially located into the first magnetic gap 220. The first diaphragm 31 is used for generating treble sound, and a sound direction of the first diaphragm 31 is upward along the vibration direction. The first diaphragm 31 includes a first dome 311, a first suspension 312 surrounding the first dome 311, a first fixing portion 313 extending from an outer edge of the first suspension 312, and a second fixing portion 314 extending from an inner edge of the first suspension 312. The first suspension 312 is a hollow annular structure, and the first suspension 312 is a structure protruding upwardly along the vibration direction. The first fixing portion 313 is attached and fixed to the inner side wall 11 of the frame 1. The first dome 311 is fixed to a lower surface of the second fixing portion 314, and is sandwiched between the second fixing portion 314 and the first voice coil 32. The first fixing portion 313 is partially sandwiched between the frame 1 and the pole plate 222.

The second vibration system 4 includes a second diaphragm 41 and a second voice coil 42 driving the second diaphragm 41 to generate sounds, and a voice coil support 43 connecting the second diaphragm 41 to the second voice coil 42. The second voice coil 42 is at least partially located into the second magnetic gap 230. The second diaphragm 41 is used for generating bass sound, and the sound direction of the second diaphragm 41 is upward along the vibration direction. The second diaphragm 41 includes a second suspension 411, a second dome 412 surrounding the second suspension 411, and a third suspension 413 surrounding the second dome 412. The second suspension 411, the second dome 412, and a third suspension 413 are all hollow annular structures. The second suspension 411 is a structure protruding upwardly along the vibration direction, and the third suspension 413 is a structure recessing downwardly along the vibration direction. The voice coil support 43 connects the second suspension 411, the second dome 412, and the third suspension 413 to the second voice coil 42. An end of the second suspension 411 proximal to the first diaphragm 31 is fixed to the outer side wall 12 of the frame 1, and/or the first magnet 221. The third suspension 413 includes a third fixing portion 4131.

A recessing portion 241 is provided on the yoke 24 corresponding to a position of the second voice coil 42 to provide enough vibration space for the second voice coil 42.

The inserting member 5 is disposed in the receiving room 210 enclosed by the side wall 211 of the magnetic bowl 21, the first circuit board 6 is attached on an outer surface of the yoke 24. A first terminal 91 is provided passing through the inserting member 5, and the first terminal 91 is connected with the first circuit board 6. The first voice coil 32 is electrically connected to the first circuit board 6 through the first terminal 91. A leakage channel 51 is provided passing through the inserting member 51.

The support shelf 7 is an annular steel ring, and the third fixing portion 4131 of the third suspension 413 is fixedly connected to the support shelf 7. Specifically, the third fixing portion 4131 covers an upper surface and part of a side surface of the support shelf 7. The pole plate 222 is fixed to an end of the support shelf 7 away from the second diaphragm 41.

The elastic assembly 8 connects the voice coil support 43 and the support shelf 7. The elastic assembly 8 includes a second circuit board 81 and a support membrane 82 connected with the second circuit board 81. The second voice coil 42 is electrically connected to the second circuit board 81. Specifically, the coaxial speaker 100 further includes a second terminal 92 connected to the second circuit board 81, and the second voice coil 42 is electrically connected to the second circuit board 81 through the second terminal 92. In this embodiment, the number of the elastic assemblies 8 is two, and each elastic assembly 8 is arranged in a direction of a short axis of the coaxial speaker 100. In other embodiments, the position of the elastic assembly 8 may be determined according to the situation.

The voice coil support 43 includes a flat portion 431 attached to the second dome 412, a first extending portion 432 bending and extending from the flat portion 431 to the second circuit board 81 and connected to the second circuit board 81, and a second extending portion 433 bending and extending from the flat portion 431 to the second voice coil 42 and connected to the second voice coil 42.

Comparing with the related art, in the coaxial speaker of present invention, the coaxial speaker includes a frame, a magnetic circuit system mounted under the frame, a first vibration system fixed on an inner side of the frame, and a second vibration system fixed on an outer side of the frame and around the first vibration system. The first vibration system locates coaxially with the second vibration system. The first vibration system includes a first diaphragm and a first voice coil driving the first diaphragm to generate sounds. The second vibration system includes a second diaphragm and a second voice coil driving the second diaphragm to generate sounds. The magnetic circuit system includes a first magnetic gap and a second magnetic gap located outside of the first magnetic gap. The first voice coil is at least partially located into the first magnetic gap, and the second voice coil is at least partially located into the second magnetic gap. The first diaphragm is used for generating treble sound, and the second diaphragm is used for generating bass sound. The coaxial speaker of the present invention arranges an annular bass vibration system for providing bass sound, a treble vibration system disposed surrounded by the bass vibration system for providing treble sound. Bass sound and treble sound form a full-range speaker, providing high-quality sound. Two voice coils using a common part of the magnetic system can further reduce the cost and improve the acoustic performance. Furthermore, an overall height of the coaxial speaker of the present invention is reduced.

It is to be understood, however, that even though numerous characteristics and advantages of the present exemplary embodiments have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A coaxial speaker, comprising:

a frame;

a magnetic circuit system mounted under the frame, the magnetic circuit system comprising a first magnetic gap and a second magnetic gap located outside of the first magnetic gap;

a first vibration system fixed on an inner side of the frame, the first vibration system comprising a first diaphragm and a first voice coil driving the first diaphragm to generate sounds, the first voice coil at least partially located into the first magnetic gap, the first diaphragm used for generating treble sound; and a second vibration system fixed on an outer side of the frame and around the first vibration system, the second vibration system located coaxially with the first vibration system, the second vibration system comprising a second diaphragm and a second voice coil driving the second diaphragm to generate sounds, the second voice coil at least partially located into the second magnetic gap, the second diaphragm used for generating bass sound;

an inserting member surrounded by the magnetic circuit system;

a first circuit board fixed with the inserting member; and a first terminal provided passing through the inserting member, the first voice coil electrically connected to the first circuit board through the first terminal.

2. The coaxial speaker as described in claim 1, wherein the coaxial speaker further comprises a support shelf and an elastic assembly connecting the second vibration system and the support shelf, the elastic assembly comprising a second circuit board and a support membrane connected with the second circuit board, the second voice coil electrically connected to the second circuit board.

3. The coaxial speaker as described in claim 2, wherein the magnetic circuit system comprises a magnetic bowl, the magnetic bowl comprising a side wall enclosing a receiving room and a bottom wall bending and extending from an end of the side wall, the inserting member accommodated in the receiving room, the magnetic circuit system further comprising a first magnet assembly disposed on one side of the magnetic bowl and a second magnet assembly disposed on the other side of the magnetic bowl, the first magnet assembly comprising a first magnet, the first magnetic gap formed between the first magnet and the side wall of the magnetic bowl, the second magnet assembly comprising a second magnet and a third magnet located outside of the second magnet and forming the second magnetic gap with the second magnet.

4. The coaxial speaker as described in claim 3, wherein the first magnet, the second magnet and the third magnet are magnetized along a vibration direction of the coaxial speaker, and the first magnet and second magnet are set opposite each other with a same pole, and the second magnet and third magnet are magnetized in opposite directions.

5. The coaxial speaker as described in claim 4, wherein the first diaphragm comprises a first dome, a first suspension surrounding the first dome, and a first fixing portion extending from an outer edge of the first suspension, the frame having an inner side wall, the first fixing portion attached and fixed to the inner side wall.

6. The coaxial speaker as described in claim 5, wherein the first magnet assembly comprises a pole plate disposed on the first magnet, and the first fixing portion is partially sandwiched between the frame and the pole plate.

7. The coaxial speaker as described in claim 4, wherein the frame comprises an outer side wall, the second diaphragm comprising a second suspension, a second dome surrounding the second suspension, and a third suspension surrounding the second dome, the third suspension mounted to the support shelf, the second vibration system further comprising a voice coil support connecting the second suspension, the second dome, and the third suspension to the second voice coil, an end of the second suspension proximal to the first vibration system fixed to the outer side wall of the frame, and/or the first magnet.

8. The coaxial speaker as described in claim 7, wherein the voice coil support comprises a flat portion attached to the second dome, a first extending portion bending and extending from the flat portion to the second circuit board and connected to the second circuit board, and a second extending portion bending and extending from the flat portion to the second voice coil and connected to the second voice coil.

9. The coaxial speaker as described in claim 1, wherein a leakage channel is provided passing through the inserting member.

* * * * *